Figure 1:
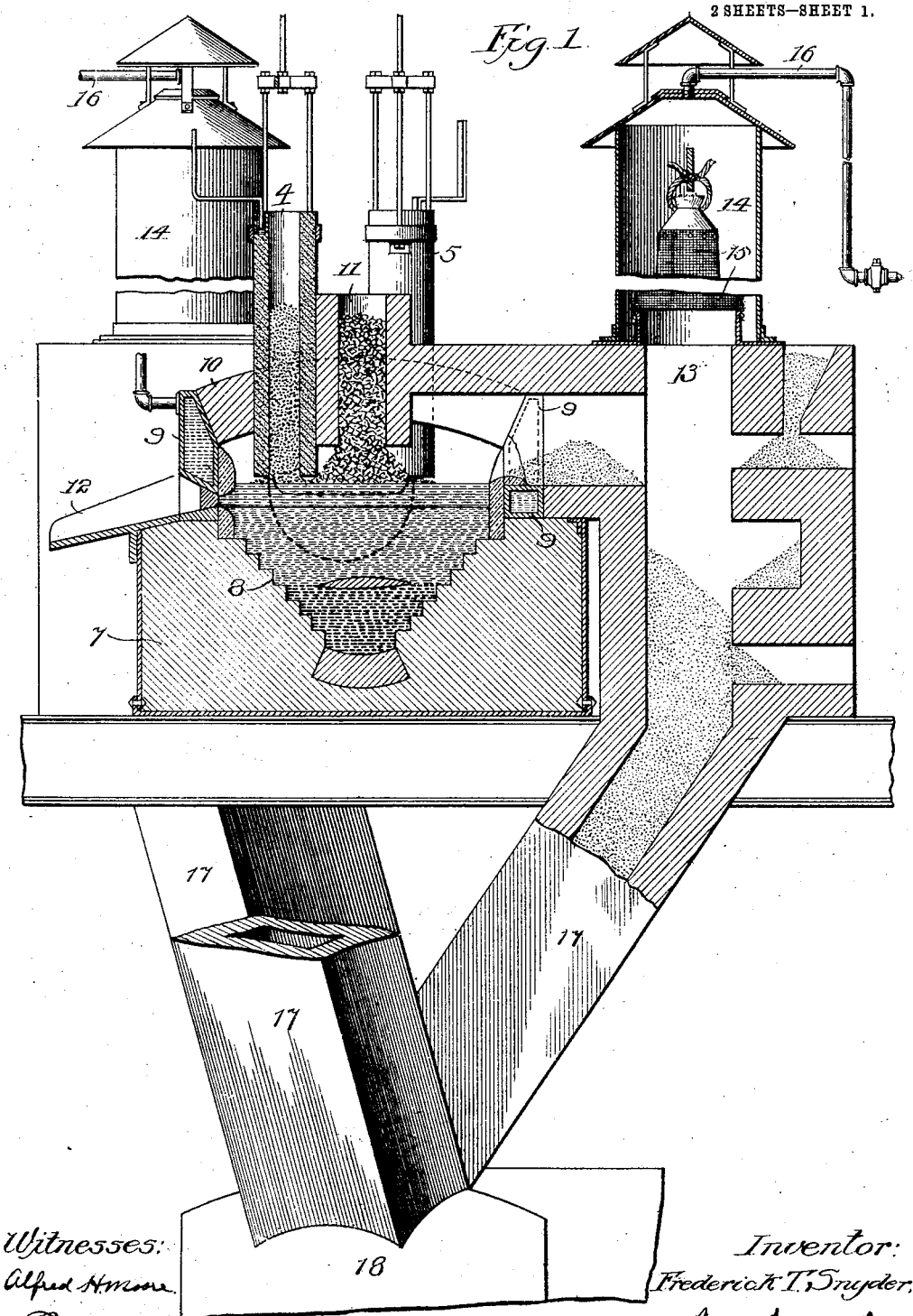

No. 859,135. PATENTED JULY 2, 1907.
F. T. SNYDER.
METALLURGICAL PROCESS.
APPLICATION FILED JUNE 30, 1906.

2 SHEETS—SHEET 1.

Witnesses:
Alfred H. Moore

Inventor:
Frederick T. Snyder,
By Barton, Tanner & Polk
Attys

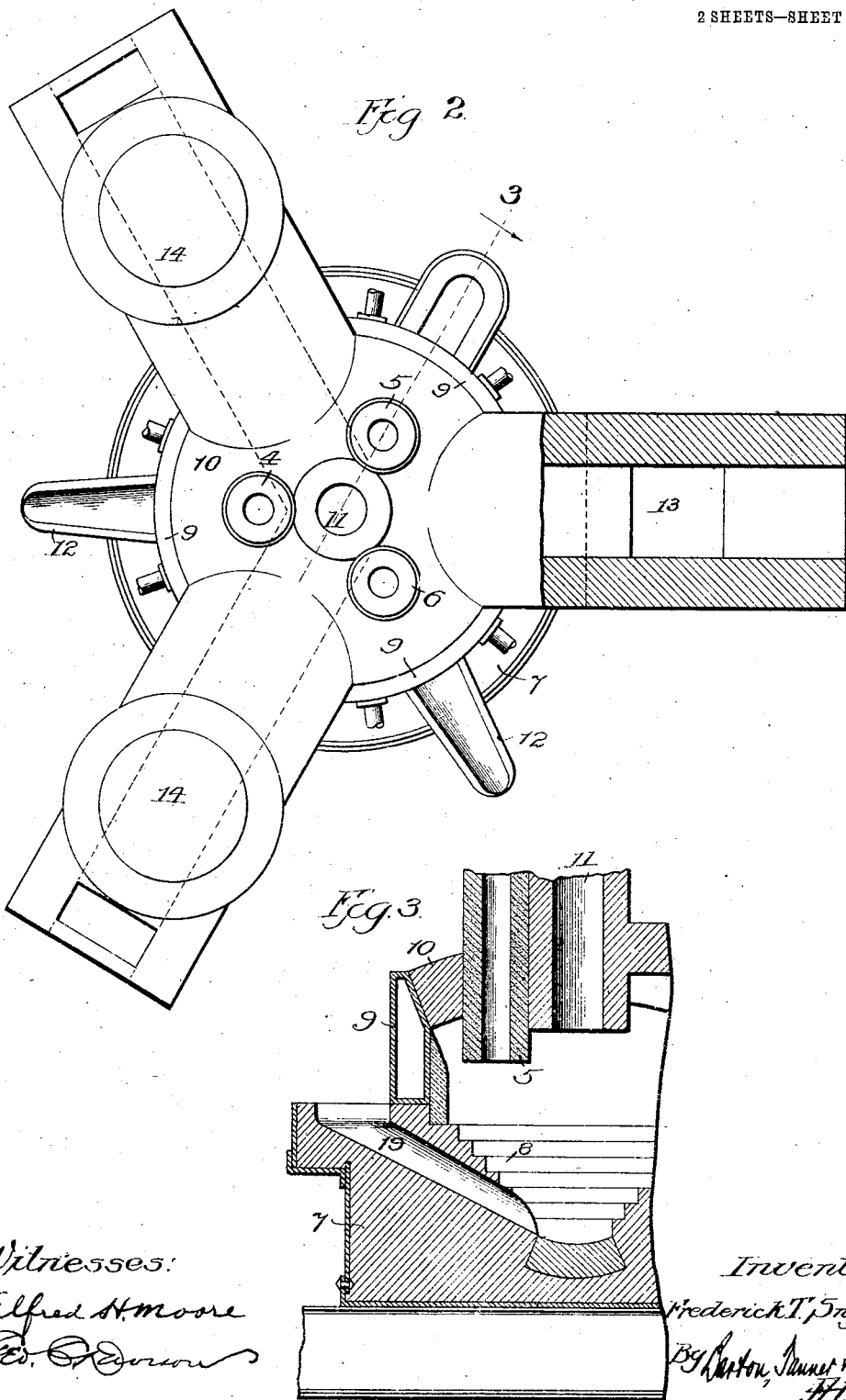

UNITED STATES PATENT OFFICE.

FREDERICK T. SNYDER, OF OAK PARK, ILLINOIS, ASSIGNOR TO ELECTRIC METALS COMPANY, OF CHICAGO, ILLINOIS, A CORPORATION OF WEST VIRGINIA.

METALLURGICAL PROCESS.

No. 859,135.     Specification of Letters Patent.     Patented July 2, 1907.

Application filed June 30, 1906. Serial No. 324,116.

*To all whom it may concern:*

Be it known that I, FREDERICK T. SNYDER, a citizen of the United States, residing at Oak Park, in the county of Cook and State of Illinois, have invented a certain new and useful Improvement in Metallurgical Processes, of which the following is a full, clear, concise, and exact description.

My invention relates to a process of electric smelting, with particular reference to ores containing both zinc and lead, although certain features of the process will be applicable to the smelting of other ores.

The objects are in general to provide for a continuous, steady and economical operation of the furnace and to avoid the destruction thereof, and to recover a maximum percentage of the metals in the ore by a single smelting operation.

One feature of the invention contemplates the operation of the furnace in such a way as to produce a lining of congealed slag around the inside of the furnace walls in which the slag bath is maintained, this lining of cold slag serving not only as a non-conductor of heat, but also as an electrical insulator to prevent the electric current from being short circuited by said walls and to protect the iron walls from the zinc vapor and other gases which would attack them.

Another feature of the invention relates to the starting of the furnace by which the formation of an arc which would volatilize the lead and carry it into the zinc condenser is avoided.

With particular reference to zinc-lead ores, the invention further contemplates the smelting of the ore in such a manner as to produce the zinc all in the form of zinc dust, and conveying such dust, while protected from the air, to a second furnace, where it is converted into spelter.

An objection to electric furnaces heretofore constructed has been that part of the zinc would condense as a liquid and part as zinc dust, the two then accumulating as a paste which clogged up the furnace and was difficult to handle.

The process is of the general type in which the ore is smelted upon a slag bath, which slag is used as a resistance medium for an electric current to produce the heat, the molten metal being collected under the bath of slag. In such a furnace, however, it is found that the slag if in contact with the metal has a tendency to dissolve the metal and waste it, and the metal may be vaporized by the excessive heat.

Another feature of this invention, therefore, involves the formation of a deep layer of liquid sulfid of the metal between the metal and the slag, thus protecting the metal from the corrosive action of the slag and from the heat which is localized in the slag. The layer of sulfids when composed of several metals is called matte. As the heat is applied at the top, there will be no considerable transmission of heat downward by convection currents; and the body of the matte when of sufficient depth permits a temperature to be maintained at the upper surface which may be several hundred degrees higher than at the lower surface which is in contact with the body of metal.

An additional feature of this invention as applied to the treatment of lead and zinc ores consists in roasting the ore only partially before smelting and making up the furnace charge in such a manner as to produce metallic iron in the furnace. This metallic iron will combine with the sulfids of zinc and lead, taking up the sulfur and freeing the zinc and lead in metallic form, so that an economical recovery of these metals results. The slag and matte produced is practically free from zinc and the expense of a very complete roasting of the ore is avoided, the sulfur being gotten rid of by the iron much cheaper than could be done by roasting.

Still another feature of the invention relates to a method of operation by which the unreduced ore is carried under a floating layer of granular carbon of maximum heat as the slag is drawn off from time to time, thus insuring the thorough reduction of the ore and preventing the unreduced ore from being drawn off with the slag when the latter is tapped.

My invention will be explained in detail, and further features thereof pointed out in connection with the accompanying drawings, which illustrate one form of apparatus which may be used with advantage to practice the said process.

Figure 1 is a vertical sectional view of the furnace; Fig. 2 is a plan view thereof; and Fig. 3 is a detail sectional view on line 3 of Fig. 3.

The same letters of reference indicate the same parts wherever they are shown.

The furnace shown in the drawing is adapted to be operated by current delivered on the three-phase system, and three electrodes 4, 5, 6, are shown, which project vertically through the roof of the furnace to receive and deliver the current. The furnace comprises a crucible 7 of refractory material, having a funnel-shaped depression 8 in the central portion thereof, adapted to receive the molten metal. The upper portion of the walls of the furnace is formed by a cylindrical water jacket 9, made in segments, each of which is provided with means for conveying the water to and from the body thereof. This cylindrical water jacket is surmounted by a dome-shaped roof 10 of refractory material, through which the carbon electrodes 4, 5, 6, project. The central portion of the dome-shaped roof 10b has an opening 11 therein through which the ore to be smelted is fed into the furnace. During the operation of the furnace the funnel-shaped crucible 8 will contain molten metal, above which there will be a layer of matte, and above that a layer of slag, and the heat will be produced by the electric current flowing between the electrodes 4, 5 and 6, through the molten materials in the furnace.

Slag taps 12 are provided, these being preferably located in alinement with the electrodes, so that as the slag is tapped off it will be drawn under the electrode and there subjected to the maximum heat. Preferably the electrodes are constructed of hollow carbon shells, which are filled with pulverized granular carbon which feeds down through the hollow shells and rests upon the slag bath underneath. The solid carbon shell preferably does not touch the slag, contact with said slag being secured through the granular carbon which is fed through the interior and floats upon the surface of the slag. By this means the wearing away of the solid carbon electrode, which is very expensive, is avoided, the portion of the electrode which is consumed being granular carbon fed down through the interior thereof. The provision of a floating electrode is also advantageous in that it makes the resistance of the electric circuit at the electrode practically constant, whether the level of the slag is high or low. In the case of solid electrodes projecting into the molten slag, it is evident that if the electrodes are stationary, and the level of the slag rises, the resistance of the contact will be reduced on account of the increased surface provided.

My arrangement permits of a better regulation and more even consumption of current. In the furnace shown flues 13, 13, are provided for carrying off the gases due to reduction. Three of these flues are shown in the plan view Fig. 2; and the vertical sectional view Fig. 1 shows how each of these flues is equipped for the purpose of collecting the zinc dust which condenses from the vapors carried off from the furnace. Each flue 13 leads to a stack 14 which may be a sheet metal pipe in which a long inverted woolen bag 15 is suspended. At the roof of the stack a pipe 16 is provided to conduct away the uncondensed gases. Immediately underneath the stacks 14 the flues 13 are continued downward and lead to pipes 17 which serve to convey the zinc dust which has been condensed in said flues to a second smelting furnace 18 located underneath. By this means the collected zinc dust may be immediately conveyed, without losing its heat and without being exposed to the air, to the second furnace where it may be resmelted and converted into spelter. This second furnace may be of the general type of the first furnace, or of any other suitable construction.

A well 19 is provided in the furnace leading upward diagonally from the bottom of the crucible to a point outside the furnace walls, as shown in Fig. 3. When the furnace is in operation this well will be filled with the molten metal which is contained in the crucible, and this metal may be withdrawn from time to time by ladling it out.

The operation of the furnace above described, in practicing the process of this invention, is as follows: The furnace is first heated by building a wood fire in the crucible for three or four days to get the brick work red hot, this fire being assisted by means of a blast which may be introduced through the lead well 19, or otherwise. After the furnace is thoroughly heated, pig lead is put in through the electrode holes and melted down. The wood fire is then allowed to burn down to embers on the top of the lead crust, these embers being then scraped up in piles, one under each electrode. The electrodes 4, 5, 6, are then let down on the piles of embers or charcoal. Cold slag, crushed to the size of walnuts, is then introduced into the furnace until there is a layer four or five inches deep on top of the lead. The slag should be heaped up against the water jacket 9 so that when it melts it will coat the water jacket clear up to the top. As the slag melts it gets sticky, and readily adheres to the cold water jackets. The current is now turned on and the furnace starts its operation. The ore to be smelted is fed through the opening 11 onto the molten slag which fills the upper portion of the furnace.

In accordance with my process, in dealing with lead-zinc sulfid ores, the ores are first roasted down to about six per cent in sulfur, and then mixed with fluxes which will form a slag running about 40 per cent in silica, 30 per cent lime and 15 per cent iron.

In order that the zinc vapor to be produced may be condensed in the form of zinc dust, and not partly in the form of liquid zinc, I make up the charge of such materials as to produce large quantities of other diluting gases, such as carbon monoxid. In practice I have found it desirable to add to the ore a gaseous coal and limestone, and for the iron flux I prefer to use iron carbonate (siderite) each of which will give off large amounts of gas, to dilute the gaseous zinc produced. I also preferably wet the charge so that a considerable volume of steam will be generated in the furnace, for the same purpose. The mixture of materials forming the furnace charge is now smelted in the interior of the furnace, in the absence of external air, the metals being reduced by the carbon in the charge supplemented by the carbon which is fed through the hollow electrodes. The excess of carbon serves to reduce the $CO_2$ to $CO$ to prevent oxidization of the zinc dust produced. The lead as it is reduced sinks to the bottom of the crucible from which it may be removed as required through the lead well 19. The zinc is volatilized and passes off with the other diluting gases through the flues 13. The zinc vapors in these flues and in the stacks 14 are condensed in the form of zinc dust which collects on the inside of the woolen bags 15 and generally throughout the flues, the accumulations falling down to the bottom when the bags are shaken, thence passing through flues 17 to the secondary furnace 18. In this secondary furnace the zinc may be resmelted in the absence of air, and converted into spelter, in accordance with the usual method, the zinc vapor produced being less diluted.

One feature of my process consists in roasting the ore only partially, so as to leave a certain amount of sulfur in the charge, which will unite with the iron, copper and other metals in the charge to form a matte, which being heavier than the slag and lighter than the lead, will collect in a layer immediately above the lead. The metallic lead is thus protected from the corrosive action of the slag by the layer of matte. In a furnace of this type the most intense heat is produced in the slag at the top where it will be best available for the reduction of the ore which is fed onto the surface of the slag; and the layer of matte between the slag and the lead serves also to protect the lead from the excessive heat, so that the tendency of the lead to vaporize and be carried over with the zinc is overcome. As the slag accumulates from time to time the excess may be drawn off through the slag taps 12. As before stated, these slag taps are in line with the electrodes, and it will be seen that the effect of drawing off the slag through these taps will be to draw down the unreduced ore from the center to a point underneath the carbon electrodes. As the most intense heat is concentrated at the electrodes, it will be seen that this heat, together with the reducing action of the granular carbon of the electrode, will serve to reduce the ore in a very thorough manner. The effect of providing the increased heat of the electrode immediately in front of the slag tap is to cause the zinc to be thoroughly boiled out of the slag before the slag is tapped. The slag must pass by the electrode to get to the tap. The electrodes being of carbon, act, as before stated, to completely reduce any zinc oxid which may be dissolved in the slag.

I prefer to regulate the furnace charge in such a manner as to produce some metallic iron in the furnace. This may be done by having a large proportion of reducing material, such as coal, in addition to the amount of iron ore in the charge. As iron is reduced from its compounds at a comparatively low heat, the metallic iron will collect in semi-solid form, floating on the molten lead. The function of this metallic iron is to decompose the zinc sulfid in the matte, thereby liberating the zinc in said matte, which is volatilized and carried off. The iron sulfid in the matte however will not be reduced, but on the contrary, iron sulfid will be formed by the metallic iron taking up sulfur from the zinc sulfid. In this manner the matte is maintained as free as possible from zinc. If it be found that too much metallic iron is formed in the furnace, this may be disposed of by adding more sulfur to the charge, forming an iron sulfid which goes to form more matte. The matte may be drawn off from time to time with the slag, and collected at the bottom of the slag pot. I have also found that when the charge contains iron oxid and an excess of carbon, if the temperature is sufficiently high to reduce part of the iron, the metallic iron produced will act to free the compounds of zinc and lead and will produce a sulfur compound of iron and a slag low in both zinc and lead.

By having the electrodes made hollow, and feeding granular carbon through them, the solid portion of the electrode may be raised above the surface of the molten slag, so as not to be consumed to any great extent, and also may be high enough so that it will not be broken by the tapping rod which is thrust into the furnace in tapping off the slag. The granular carbon floating on the surface of the slag insures a practically uniform resistance of the contact between the slag and the electrode, whatever the depth of the slag may be.

A further feature of the invention resides in the method of regulation made possible by supplying granular carbon to the electrodes. By reference to Fig. 1, it will be seen that part of the current may pass horizontally through the slag, while another portion of the current will pass from one electrode crosswise or vertically through the slag and the matte to the lead, and thence through the lead to the vicinity of the other electrode, these two paths for the current being indicated by dotted lines. When the slag is tapped down, the metal level being maintained constant, it will be seen that the resistance of the path through the slag will increase. If the resistance of the metal be low relative to the slag, (either by its composition or volume) the second path in series through the slag and matte, and then through the lead, will decrease in resistance. By properly proportioning the volume and dimensions of the slag and metal bodies in accordance with their specific resistance, the increase in resistance of the first path, when slag is tapped, can be made to approximately balance the decrease in resistance of the second path. In this way the current taken by the furnace at constant potential will remain constant, and the load on the generators will therefore not fluctuate. This method of regulation, to provide for an even consumption of current, is of advantage, because the amount of current taken by the furnace is very great. During the operation of the furnace the slag which touches the walls will be immediately cooled by the flowing water surrounding these walls. As slag when cold is a nearly perfect insulator, it will be seen that this formation of a slag lining on the inside of the furnace effectually prevents short circuiting of the current which would otherwise tend to flow through the walls of the furnace; the most refractory material being electrically conducting at the high temperature employed. The formation of this lining of cold slag also serves to protect the furnace from the corrosive action of the molten slag and the gaseous zinc in the interior, and also to prevent undue waste of heat. The slag lining is self-renewing, because if a portion is removed, any molten slag coming in contact with the wall is instantly congealed by the flowing water.

By proportioning the materials of the charge in such a manner as to produce large quantities of diluting gases in the furnace, I prevent the furnace from being clogged up by the paste which would be formed if the zinc condensed partly as a liquid. The process is economical, moreover, because the zinc dust produced by the first furnace is entirely protected from the air, and may be conveyed immediately, while retaining as much of its original heat as possible, to the second furnace, to be converted into spelter.

The particular form of furnace shown and described herein is made the subject matter of a separate application, Serial No. 324,117, filed June 30th, 1906. It will be apparent that certain features of the process herein described may be adopted in metallurgical operations not in all respects identical with the particular one herein set forth, and not embodying all the features hereof, and I desire my claims to be understood accordingly. I also wish to refer to my copending applications as follows, all of which relate to the same general subject matter, namely, to the treatment of zinc ore, and some of which claim matter disclosed but not claimed herein: Serial No. 266,208, filed June 21st, 1907; Serial No. 266,541, filed June 23rd, 1905; Serial No. 321,159, filed June 11th, 1906; Serial No. 322,140, filed June 18th, 1906; Serial No. 323,211, filed June 25th, 1906; Serial No. 327,635, filed July 25th, 1906; Serial No. 336,186, filed September 25th, 1906.

I claim:

1. The process of treating zinc ore which consists in smelting the ore in the absence of air with carbon and gas-forming materials sufficient to produce metallic zinc vapor diluted to such an extent that it will not condense in coherent liquid form, collecting the metallic zinc dust and conveying the same in its heated condition, and while protected from the air, to a second smelting furnace, there revaporizing said zinc and then condensing it in coherent form.

2. The process of treating zinc ore which consists in subjecting the ore to an oxidizing roast, mixing it with gas-forming fluxes, smelting the mixture in the absence of air by heat produced electrically in the body of the mixture, whereby metallic zinc vapor is given off, diluted with other gases, condensing the zinc vapor as metallic zinc dust, conveying the zinc dust to a second smelting furnace, while protecting the same from the air, revaporizing said dust in the absence of air, and condensing the same in coherent liquid form.

3. The process of treating lead-zinc sulfid ore which consists in partially roasting the ore, then mixing it with gaseous coal, limestone and iron, and smelting the mixture in a crucible closed against the external air, producing molten lead which collects at the bottom of the crucible, a layer of matte above the lead, and molten slag above the matte; said matte serving to protect the lead from the action of the slag, the zinc being reduced and volatilized and diluted with large quantities of other gases from the materials of the charge; and condensing the zinc vapor in the form of zinc dust.

4. The process of smelting ores which consists in feeding said ores upon a slag bath, continuously feeding granular carbon to said bath to maintain an electrode floating upon the surface thereof, passing an electric current between said floating electrode and another point in said bath to heat the same, and drawing off the slag from time to time at a point adjacent to said floating electrode, opposite the point where the ore is fed to the bath, whereby the ore is drawn under the floating electrode and subjected to the localized heat thereof and to the reducing action of said granular carbon.

5. The process of smelting ores which consists in feeding said ores with reducing and slag-forming material to the central portion of a fused slag bath, continuously feeding granular carbon to different points on the surface of said bath radially outside said central portion, to form and maintain floating electrodes thereon, passing electric current through said bath between said electrodes, collecting the metal thereby produced, and drawing off the slag from time to time, at the edge of said bath at a point radially in alinement with one of said electrodes, whereby the unreduced ore at the central portion of the bath surface is drawn under the electrode and there subjected to the maximum heat and to the reducing action of the granular carbon thereof.

6. The process of starting an electric furnace which consists in first heating the interior thereof by burning fuel therein, adding easily melted metal and allowing the same to accumulate in molten condition underneath the fuel, collecting the embers of the fuel in separate piles on top of the metal, bringing electrodes into contact with the respective piles of embers and then passing an electric current between said electrodes through the embers and the underlying metal; whereby the formation of an arc at the surface of the metal is avoided.

7. The process of operating an electric furnace which consists in supplying an excess of molten slag in the furnace, maintaining a flow of cooling fluid around the walls of the furnace to cause the slag to accumulate as a lining around the inside of said walls, and heating the furnace by passing an electric current through the molten slag in the central portion thereof, while the cooled slag around the walls serves to electrically insulate said walls and thereby to prevent undue leakage of current through the same.

8. The process of operating an electric furnace which consists in passing an electric current between two points in a slag bath, maintaining a flow of cooling fluid around the walls of said bath, and heaping up slag-forming materials around the inside of said walls whereby the slag is congealed to form an electrically-insulating inner coating for said walls and prevents the short-circuiting of the electric current by said walls and the corrosion of said walls by the products of reduction.

9. The process of smelting ores which consists in feeding said ores upon the surface of a fused mineral bath, passing an electric current between two electrodes in said bath, and drawing off the excess of slag from time to time at the edge of the bath at a point adjacent to and in line with one of said electrodes, opposite the point where the ore is fed to the bath; whereby the slag is subjected to the maximum heat at the electrode just before being drawn off, and the unreduced ore is drawn nearer to the electrode.

10. The process of treating lead-zinc sulfid ore, which consists in partially roasting the ore, mixing it with carbon and slag-forming fluxes, containing iron, smelting the mixture in a furnace closed against the external air, producing molten lead which collects at the bottom of the furnace, a layer of matte above the lead and molten slag above the matte, the zinc being reduced and volatilized, the furnace charge being regulated to produce metallic iron in the furnace, which collects near the matte and takes up sulfur from the zinc sulfid therein, allowing the metallic zinc to escape as vapor.

11. The process of smelting ores which consists in feeding said ores with slag-forming and reducing material upon a slag bath, continuously feeding comminuted carbon to different points on the surface of said bath forming floating electrodes on such surface, adapted to rise and fall therewith, allowing the reduced metal to collect in a body underneath said slag, passing an electric current between said floating electrodes in two paths, one direct path horizontally across the slag and the other vertically through the slag and including the metal in series, and regulating the flow of current as between the two paths by tapping off the slag, thereby increasing the resistance of the direct horizontal path across the slag and correspondingly decreasing the resistance of the other path in which the thickness of the slag layer is in series with the metal; whereby the total current is maintained approximately constant.

12. The process of smelting material containing a compound of a metal volatile at reduction which consists in smelting the ore with a reducing agent and gas-forming materials, sufficient to dilute the metallic vapor given off to such an extent that it will not condense in coherent form.

13. The process of treating zinc bearing material which consists in mixing said material with reducing and fluxing agents capable of liberating gases largely in excess of the gases produced in reducing the zinc from said material, whereby the zinc produced will condense in the form of dust, smelting said mixture and removing and resmelting said dust out of contact with air.

14. The process of treating zinc ore which consists in smelting it with limestone, a gas-forming coal and iron carbonate, and condensing the resulting vapor in the form of dust, said elements all giving off large quantities of gas which dilutes the zinc vapor sufficiently to prevent any condensation thereof as a liquid.

15. The process of smelting ores which consists in passing said ores with reducing and slag-forming materials upon a fused slag bath, passing said ore under an electrode, continuing the movement of said ore until completely reduced and fused and drawing off the resulting slag at a point so located as to induce said movement of the ore by the movement of the said slag.

16. The process of treating zinc-lead sulfid ore which consists in partially roasting said ore and smelting the same with oxid of iron and an excess of carbon, thereby producing metallic lead, a layer of matte above the lead, and a superposed body of slag, the temperature being maintained sufficiently high to also produce metallic iron in the furnace, said iron collecting between the slag and matte and reacting to free the zinc and lead from their sulfur compounds in the matte and slag, thereby increasing the recovery of these metals.

17. The process of treating zinc sulfid ore which consists in partially roasting the ore, leaving a substantial proportion of sulfur therein, mixing the ore with carbon and fluxes, and smelting the same upon a bath of fused slag, producing additional slag, molten metal and a deep body of matte between the slag and the metal.

18. The process of treating ore which consists in smelting it with carbon and fluxes upon a bath of fused slag, producing additional slag and molten metal which collects at the bottom of the bath underneath said slag, the charge being also regulated to produce a deep layer of matte between the metal and the slag, a smelting heat being developed electrically and localized in the slag and in the upper portion of the matte, the matte being sufficiently thick to maintain the surface of the molten metal at a temperature considerably below such smelting temperature.

In witness whereof, I, hereunto subscribe my name this 28th day of June A. D., 1906.

FREDERICK T. SNYDER.

Witnesses:
A. H. MOORE,
D. C. TANNER.